(12) United States Patent
Cheung et al.

(10) Patent No.: US 7,336,677 B2
(45) Date of Patent: Feb. 26, 2008

(54) MULTI-FUNCTIONAL SWITCH FABRIC APPARATUS AND CONTROL METHOD FOR THE SAME

(75) Inventors: Tae Sik Cheung, Daejeon (KR); Jeong Hee Lee, Daejeon (KR); Bhum Cheol Lee, Daejeon (KR)

(73) Assignee: Electronics & Telecommunications Research Institute (KR)

( * ) Notice: Subject to any disclaimer, the term of this patent is extended or adjusted under 35 U.S.C. 154(b) by 920 days.

(21) Appl. No.: 10/621,808

(22) Filed: Jul. 17, 2003

(65) Prior Publication Data
US 2004/0120338 A1   Jun. 24, 2004

(30) Foreign Application Priority Data
Dec. 18, 2002   (KR) .................... 10-2002-0081386

(51) Int. Cl.
*H04L 12/28* (2006.01)
(52) U.S. Cl. ...................... 370/419; 370/230
(58) Field of Classification Search ................ 370/231, 370/419, 417, 387; 710/52, 20, 21
See application file for complete search history.

(56) References Cited

U.S. PATENT DOCUMENTS

| | | | | |
|---|---|---|---|---|
| 5,765,032 A | * | 6/1998 | Valizadeh ................... | 709/235 |
| 5,872,769 A | * | 2/1999 | Caldara et al. ............. | 370/230 |
| 6,052,373 A | | 4/2000 | Lau ............................ | 370/399 |
| 6,240,087 B1 | * | 5/2001 | Cummings et al. ......... | 370/360 |
| 6,904,047 B2 | * | 6/2005 | Han et al. .................... | 370/414 |
| 6,907,041 B1 | * | 6/2005 | Turner et al. ................ | 370/412 |
| 2001/0033581 A1 | | 10/2001 | Kawarai et al. ............. | 710/317 |
| 2002/0064156 A1 | * | 5/2002 | Minkenberg ................ | 370/392 |
| 2002/0075871 A1 | | 6/2002 | Blane et al. ................. | 370/390 |
| 2002/0075883 A1 | * | 6/2002 | Dell et al. ................... | 370/413 |
| 2002/0099900 A1 | | 7/2002 | Kawarai et al. ............. | 370/468 |
| 2002/0110086 A1 | * | 8/2002 | Reches ....................... | 370/235 |
| 2002/0156940 A1 | | 10/2002 | Meyer et al. ................. | 710/1 |
| 2002/0176431 A1 | * | 11/2002 | Golla et al. ................. | 370/412 |

FOREIGN PATENT DOCUMENTS

KR   1999-0061215   7/1999

* cited by examiner

*Primary Examiner*—Edan Orgad
*Assistant Examiner*—Lawrence J Burrowes
(74) *Attorney, Agent, or Firm*—Blakely Sokoloff Taylor & Zafman

(57) ABSTRACT

A multi-functional switch fabric apparatus and a control method for a multi-functional switch fabric apparatus are provided. The multi-functional switch fabric apparatus includes a plurality of input data processors, which copy, distribute, switch, and output input user data according to a mode set signal from the outside, a switch fabric unit, which includes a plurality of switching units and selectively outputs the user data input from the plurality of input data processors according to the mode set signal, a plurality of output data processors, which buffer, schedule, multiplex, and output the user data input from the switch fabric unit, and a control unit, which outputs the mode set signal to control the plurality of input data processors, the switch fabric unit, and the plurality of output data processors.

16 Claims, 6 Drawing Sheets

MULTI-FUNCTIONAL SWITCH FABRIC APPARATUS AND CONTROL METHOD FOR THE SAME

BACKGROUND OF THE INVENTION

This application claims the priority of Korean Patent Application No. 2002-81386, filed on Dec. 18, 2002, in the Korean Intellectual Property Office, which is incorporated herein in its entirety by reference.

1. Field of the Invention

The present invention relates to a multi-functional switch fabric apparatus and a control method for the same to provide services using hardware regardless of the technical fields and network requirements to which the apparatus is applied, and more particularly, to a multi-functional switch fabric apparatus and a control method for the same to support services provided to a network, which has various and contradictory requirements, using hardware. The various and contradictory requirements include supporting a network in which various transfer methods are present, requiring a restricted redundancy to improve reliability, requiring discriminatory services according to service grade, and requiring to construct the network at a low cost.

2. Description of the Related Art

As communication technology improves, switch fabric apparatuses have been developed to support both Internet packet (IP) communication and asynchronous transfer mode (ATM) communication that have different attributes, so requirements for the switch fabric apparatuses become varied. Since the IP based switch fabric apparatuses are generally applied to router systems, a low network construction cost is required. On the other hand, since the ATM based switch fabric apparatuses are generally applied to ATM switch systems, an improved reliability and discriminatory services are required.

However, since the requirements of the switch fabric apparatuses are contradictory, a conventional switch fabric apparatus cannot satisfy all of them at the same time. Furthermore, it is impossible for the conventional switch fabric apparatus to satisfy a transfer method other than the IP and ATM methods. Accordingly, an overlay network structure has been used to satisfy the requirements of the switch fabric apparatuses. However, since different systems are used in the overlay network structure, disadvantages such as difficult and expensive maintenance and repairing operations and low reliability of the systems occur.

The switch fabric apparatuses are used in a router system, an ATM switch system, a TDM system, and a PSTN switch. Since line interface cards and protocol engines of the switch fabric apparatuses are changed according to the switching method, the types and the application fields of the systems are determined based on the switch fabric apparatuses. In other words, the switch fabric hardware shapes are different according to the application fields, so the maintenance of the switch fabric apparatuses is difficult and reliability of the switch fabric apparatuses is lowered when interacting with the network.

SUMMARY OF THE INVENTION

The present invention provides a multi-functional switch fabric apparatus and a control method for the same which can be applied to a network field where a plurality of transfer methods are present, a network field where improved usability and reliability are required, a network field where discriminatory services are required, and a network field where a low cost is required, using switch fabrics having the same shape.

The present invention also provides a storage medium including a program for operating a control method for a multi-functional switch fabric apparatus, which can be applied to a network field where a plurality of transfer methods are present, a network field where improved usability and reliability are required, a network field where discriminatory services are required, and a network field where a low cost is required, using switch fabrics having the same shape, in a computer.

According to an aspect of the present invention, there is provided a multi-functional switch fabric apparatus. The apparatus includes a plurality of input data processors, which copy, distribute, switch, and output input user data according to a mode set signal from the outside; a switch fabric unit, which includes a plurality of switching units and selectively outputs the user data input from the plurality of input data processors according to the mode set signal; a plurality of output data processors, which buffer, schedule, multiplex, and output the user data input from the switch fabric unit; and a control unit, which outputs the mode set signal to control the plurality of input data processors, the switch fabric unit, and the plurality of output data processors.

Preferably, the input data processor includes a path and mode set unit, which copies, switches, or distributes the user data to a path that is set based on the mode set signal; and a plurality of unit inlet data processors, which are connected to the path and mode set unit to buffer, virtual output buffer queue, schedule, switch, or de-multiplex the user data.

Preferably, the output data processor includes a filter unit, which selectively passes the user data input from the switch fabric unit according to the mode set signal; a plurality of buffer units, which buffer the user data passed through the filter unit; a path change unit, which selects and outputs the user data input from the plurality of buffer units according to a predetermined path change signal; and a path control unit, which outputs the path change signal according to the mode set signal.

Preferably, the plurality of switching units included in the switch fabric unit are crossbar switches, and the control unit outputs a first mode set signal, which allows the path and mode set unit to copy and supply the user data to the plurality of unit inlet data processors, at least one of the switching units to operate as an active switch, and the outlet data processor to select one of the user data input from the switch fabric unit as an effective data.

Preferably, the outlet data processor selects the user data, which is provided from the switch in an active state, as the effective data.

Preferably, when an error occurs in the connection to the switch operating in an active state, the output data processor selects the user data, which is provided from the switch in a standby state, as an effective state.

Preferably, the plurality of switching units included in the switch fabric unit are crossbar switches, and the control unit outputs a second mode set signal, which allows the path and mode set unit to distribute the user data to the plurality of unit inlet data processors, the switching units to operate as active switches, and the outlet data processor to schedule and output the plurality of user data input from the switch fabric unit.

Preferably, the switch fabric unit includes a plurality of switches that transfer data by different methods, and the control unit outputs a third mode set signal, which allows the path and mode set unit to distribute the user data to the plurality of unit inlet data processors according to the service type of the user data, and the outlet data processor to schedule and output the plurality of user data input from the switch fabric unit.

According to another aspect of the present invention, there is provided a control method for a multi-functional switch fabric apparatus. The control method comprises copying, switching, or distributing input user data to a predetermined path according to a predetermined mode set signal; buffering, virtual output buffer queuing, scheduling, switching, or de-multiplexing the user data according to the mode set signal; selectively outputting the user data according to the mode set signal by using a plurality of switching units; and buffering, scheduling, or multiplexing and outputting the user data according to the mode set signal.

Preferably, selectively outputting the user data comprises selectively passing the user data input from the switching units according to the mode set signal; buffering the passed user data; and selectively outputting the buffered user data according to a predetermined path change signal.

Preferably, the plurality of switching units are crossbar switches of which at least one operates as an active switch, the input user data are copied and supplied to each of a plurality of unit inlet data processors when copying, switching, or distributing input user data to the predetermined path according to the predetermined mode set signal, and one of the plurality of user data input from the switching units is selected and output as an effective data when selectively outputting the user data according to the mode set signal by using a plurality of switching units.

Preferably, the user data output from the switching unit operating as an active switch is selected and output as the effective data when selectively outputting the user data according to the mode set signal by using a plurality of switching units.

Preferably, when an error occurs in the connection to the switching unit operating as the active switch, the user data, which is provided from the switching unit operating as a standby switch, is selected and output as an effective data.

Preferably, the plurality of switching units are crossbar switches in an active state, the user data are distributed to each of the plurality of unit inlet data processors when copying, switching, or distributing input user data to the predetermined path according to the predetermined mode set signal, and the plurality of user data input from the switching units are scheduled and output when selectively outputting the user data according to the mode set signal by using a plurality of switching units.

Preferably, the switching units are switches that transfer data by different methods, the user data are distributed to the plurality of unit inlet data processors according to the service type of the user data when copying, switching, or distributing input user data to the predetermined path according to the predetermined mode set signal, and the plurality of user data input from the plurality of switch units are scheduled and output when selectively outputting the user data according to the mode set signal by using a plurality of switching units.

BRIEF DESCRIPTION OF THE DRAWINGS

The above aspects and advantages of the present invention will become more apparent by describing in detail preferred embodiments thereof with reference to the attached drawings in which.

DETAILED DESCRIPTION OF THE INVENTION

The present invention will now be described more fully with reference to the accompanying drawings, in which preferred embodiments of the invention are shown.

Figure 1:
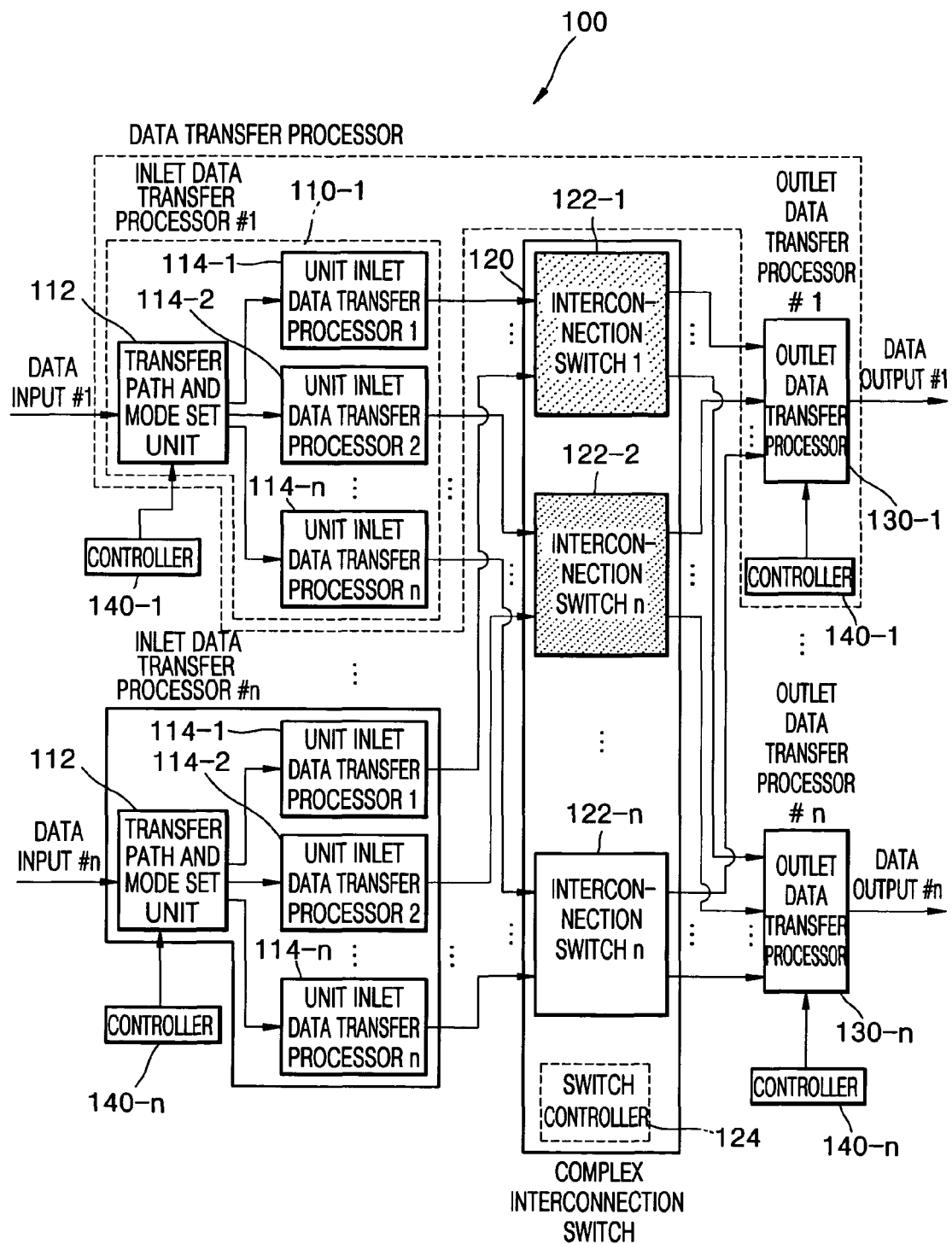
FIG. 1 is a block diagram illustrating a multi-functional switch fabric apparatus according to the present invention.

FIG. 1 is a block diagram illustrating a multi-functional switch fabric apparatus according to the present invention.

Referring to FIG. 1, a multi-functional switch fabric apparatus 100 according to the present invention includes a plurality of inlet data transfer processors 110-1 through 110-n, a complex interconnection switch 120, a plurality of outlet data transfer processors 130-1 through 130-n, and control units 140-1 through 140-n.

The inlet data transfer processors 110-1 through 110-n perform buffering, virtual output buffer queuing, scheduling, switching, or de-multiplexing input user data. The inlet data transfer processor 110-1 includes a transfer path and mode set unit 112 and a plurality of unit inlet data transfer processors 114-1 through 114-n.

The transfer path and mode set unit 112 copies, switches, or distributes the user data based on a path or a mode that is preset by the control units 140-1 through 140-n. The unit inlet data transfer processors 114-1 through 114-n are connected to the transfer path and mode set unit 112 to perform buffering, virtual output buffer queuing, scheduling, switching, or de-multiplexing the user data. Each of the unit inlet data transfer processors 114-1 through 114-n is connected to each of interconnection switches 122-1 through 122-n included in the complex interconnection switch 120, respectively.

The complex interconnection switch 120 switches the user data received from the inlet data transfer processors 110-1 through 110-n to the outlet data transfer processors 130-1 through 130-n. The complex interconnection switch 120 includes a plurality of interconnection switches 122-1 through 122-n and a switch controller 124. The unit inlet data transfer processors 114-1 through 114-n of the inlet data transfer process units 110-1 through 110-n are successively connected to the interconnection switches 122-1 through 122-n. However, the connection of the unit inlet data transfer processors 114-1 through 114-n of the inlet data transfer process units 110-1 through 110-n and the interconnection switches 122-1 through 122-n of the complex interconnection switch 120 shown in FIG. 1 is merely an example, and the connection can be changed within the scope of the present invention.

The outlet data transfer processors 130-1 through 130-n are connected to the plurality of interconnection switches 122-1 through 122-n to select, buffer, schedule, and multiplex the user data that are output from the interconnection switches 122-1 through 122-n, based on a function preset by the control units 140-1 through 140-n.

As shown in FIG. 1, an inlet data transfer processor 110-1 and the corresponding outlet data transfer processor 130-1 construct a data transfer processor.

Each of the control units 140-1 through 140-n controls each of the data transfer processors. For example, the control unit 140-1 controls the data transfer processor formed of the inlet data transfer processor 110-1 and the outlet data transfer processor 130-1. The control unit 140-1 is connected to the transfer path and mode set unit 112 and the outlet data transfer processor 130-1 in order to set the functions of the transfer path and mode set unit 112, for example, copying the user data, separating traffic by service, separating traffic by QoS, and de-multiplexing, and the functions of the outlet data transfer processor 130-1, for example, selecting, buffering, scheduling, and multiplexing the user data.

Structural differences between the multi-functional switch fabric apparatus according to the present invention as shown in FIG. 1 and a conventional switch fabric apparatus are as follows.

First, an inlet data transfer processor in the conventional switch fabric apparatus is formed of one unit inlet data transfer processor. However, the inlet data transfer processor 110-1 according to the present invention is formed of a plurality of unit inlet data transfer processors 114-1 through 114-n and the transfer path and mode set unit 112, which converts the transfer method of data to the plurality of unit inlet data transfer processors 114-1 through 114-n.

Second, the inlet data transfer processor and an outlet data transfer processor of the conventional switch fabric apparatus can be connected to a multiple interconnection switch formed of one or a plurality of interconnection switches that perform the same function. However, the inlet data transfer processors 110-1 through 110-n and the outlet data transfer processors 130-1 through 130-n according to the present invention can be connected to the complex interconnection switch 120 formed of the interconnection switches 122-1 through 122-n that perform the same or different functions.

Figure 2:
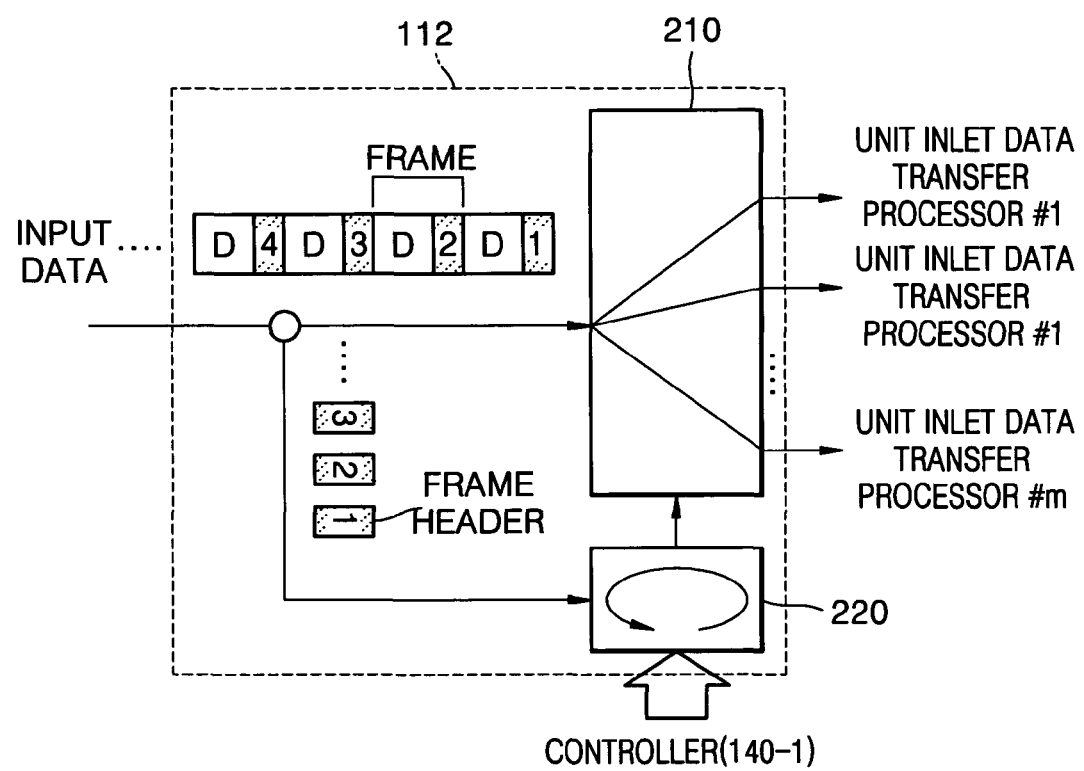
FIG. 2 is a block diagram illustrating a transfer path and mode set unit according to a first embodiment of the present invention.

FIG. 2 is a block diagram illustrating the transfer path and mode set unit 112 according to a first embodiment of the present invention.

Referring to FIG. 2, the transfer path and mode set unit 112 is formed of a path change unit 210 and the path control unit 220.

The path change unit 210 copies, switches, or distributes the input user data to M output terminals. Here, M denotes an integer equal to or larger than two. The path control unit 220 selectively receives an operator command input through the controller 140-1 and frame header information extracted from the user data and controls the path change unit 210 to perform copying, switching, or distributing of the user data. The path change unit 210 may be formed of a one to M de-multiplexer of simple structure. In addition, the path control unit 220 may include a decoding function or a scheduling function for controlling the path change unit 210 by various methods.

On the other hand, the unit inlet data transfer processors 114-1 through 114-n perform the same function as the conventional inlet data transfer processor. Here, the unit inlet data transfer processors 114-1 through 114-n can be formed in a virtual output queue (VOQ) structure. In addition, the complex interconnection switch 120 can be formed in the structure of common buffer switch or crossbar switch.

Figure 3:
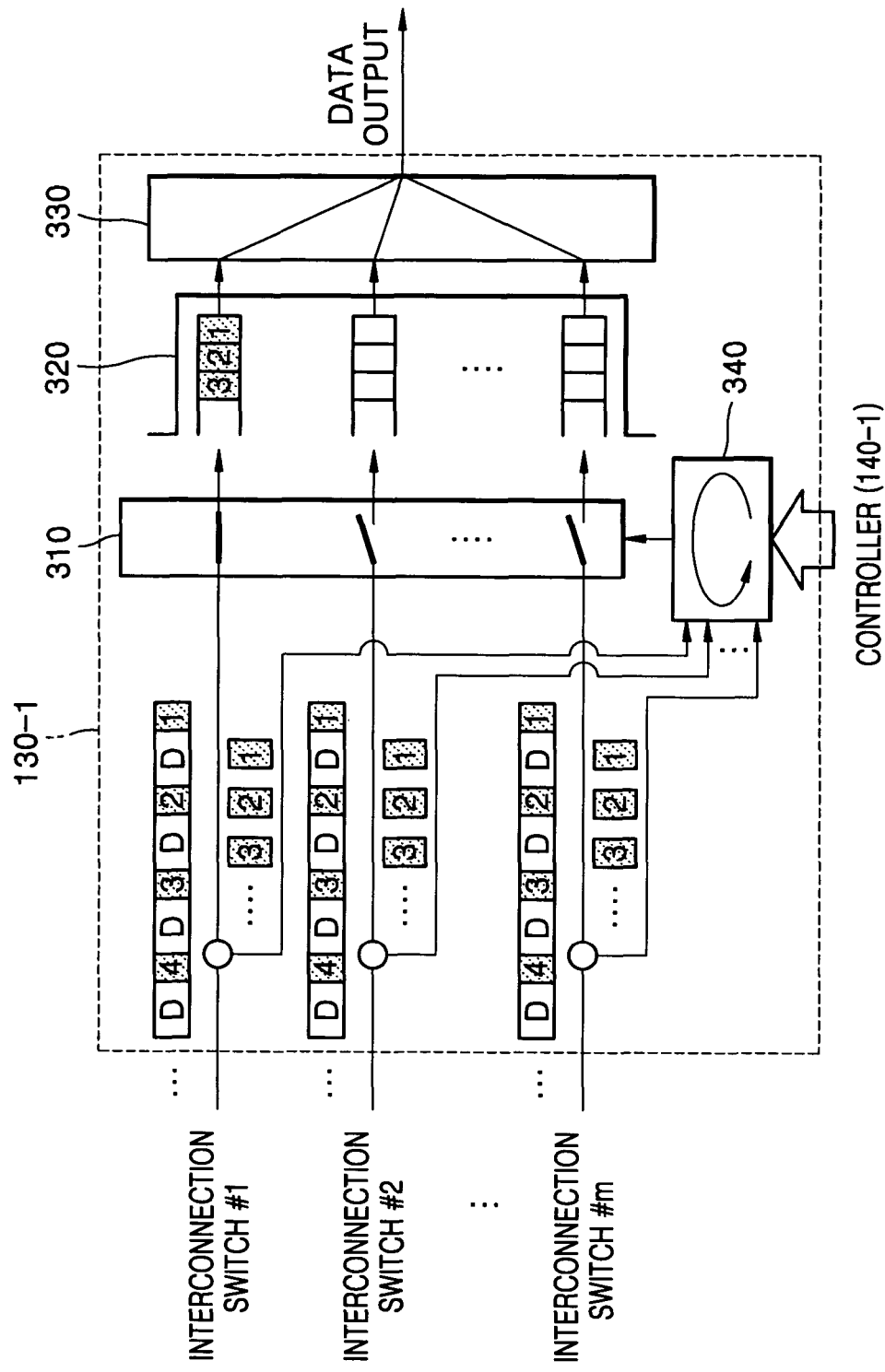
FIG. 3 is a block diagram illustrating an outlet data transfer processor according to a first embodiment of the present invention.

FIG. 3 is a block diagram illustrating the outlet data transfer processor 130-1 according to a first embodiment of the present invention.

Referring to FIG. 3, the outlet data transfer processor 130-1 is formed of a filter unit 310, a buffer unit 320, a path change unit 330, and a path control unit 340.

The filter unit 310 blocks or passes the user data input from M different interconnection switches. The buffer unit 320 is formed of M buffers to buffer the user data passed through the filter unit 310. The path change unit 330 selects the user data that are input from the M different interconnection switches and buffered in the buffer unit 320, based on a predetermined rule in order to output the selected user data. The path control unit 340 receives the operator command input through the controller 140-1 and the frame header information extracted from the user data to control the filter unit 310 and the path change unit 330.

Here, the filter unit 310 used to prevent needless user data from being stored in a buffer unit can be realized using a simple logic circuit. The buffer unit 320 can be realized using a conventional buffer, such as a first input first output (FIFO) buffer. In addition, the path change unit 330 can be realized using an M to one multiplexer of a simple structure. The path control unit 340 may include a decoding function or a scheduling function for controlling the path change unit 330 by various methods.

The data transfer processors of FIGS. 2 and 3 are limited to process single user data. However, when the one to M path change device and the M to one path change device of FIGS. 2 and 3 are changed to K to M path change device and M to K path change device, respectively, the data transfer processors that process K user data can be realized. Here, K denotes an integer equal to or larger than two.

Hereafter, the functions of the switch fabric apparatus according to a first embodiment of the present invention will be described. In the first embodiment of the present invention, the number of unit inlet data transfer processors in an inlet data transfer processor and the number of interconnection switches in a complex interconnection switch are limited to two for the convenience of description.

Figure 4:
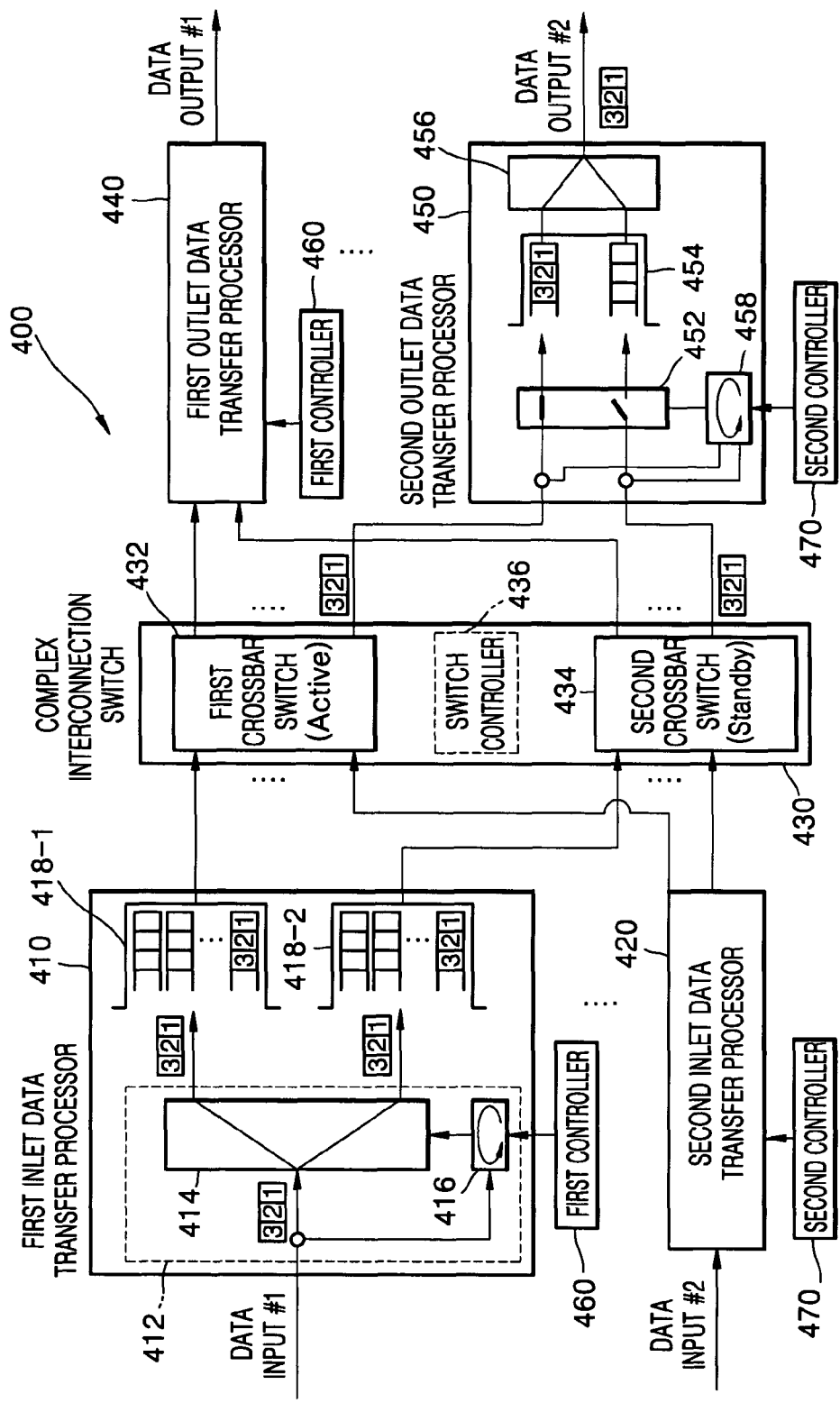
FIG. 4 is a block diagram illustrating a multi-functional switch fabric apparatus having a 1+1 redundancy function of link unit, according to a first embodiment of the present invention.

FIG. 4 is a block diagram illustrating a multi-functional switch fabric apparatus having a 1+1 redundancy of line unit, according to a first embodiment of the present invention.

Referring to FIG. 4, a multi-functional switch fabric apparatus 400 according to the first embodiment of the present invention includes a first inlet data transfer processor 410, a second inlet data transfer processor 420, a complex interconnection switch 430, a first outlet data transfer processor 440, a second outlet data transfer processor 450, a first controller 460, and a second controller 470.

The first inlet data transfer processor 410 is formed of a transfer path and mode set unit 412 and two unit inlet data transfer processors 418-1 and 418-2. The structure and the function of the transfer path and mode set unit 412 are the same as those of the transfer path and mode set unit 112 of FIG. 1, so the description thereof will not be repeated. The structures and the functions of the unit inlet data transfer processors 418-1 and 418-2 are the same as those of the unit inlet data transfer processors 114-1 through 114-n of FIG. 1. In addition, the structure and the function of the second inlet data transfer processor 420 are the same as those of the first inlet data transfer processor 410.

The complex interconnection switch 430 is formed of two identical crossbar switches 432 and 434 and a switch control unit 436. Here, the first crossbar switch 432 is in an active state and the second crossbar switch 434 is in a standby state.

The structures and the functions of the first and second outlet data transfer processors 440 and 450 are the same as those of the outlet data transfer processors 130-1 through 130-n of FIG. 1, so the description thereof will not be repeated. However, different reference numerals are assigned to the elements of the second outlet data transfer processor 450 for the convenience of description.

The first controller 460 controls the operations of the first inlet and first outlet data transfer processors 410 and 440, and the second controller 470 controls the operations of the second inlet and second outlet data transfer processors 420 and 450.

When the mode of the switch fabric apparatus 400 is set to have a 1+1 redundancy function, the transfer path and mode set unit 412 is set to copy the user data. In addition, the outlet data transfer processors 440 and 450 are set to select one of the user data input from the crossbar switches 432 and 424 as an effective data. In other words, when the user data are input to the inlet data transfer processors 410 and 420, the transfer path and mode set unit 412 copies the input user data. The user data are stored in corresponding VOQs in the unit inlet data transfer process units 418-1 and 418-2.

The method of transferring and switching user data among one unit inlet data transfer processor, one interconnection switch, and one outlet data transfer processor is the same as that among a conventional inlet data transfer processor of VOQ type, a conventional interconnection switch of crossbar switch type, and a conventional outlet data transfer processor.

Two identical user data are input to the outlet data transfer processors 440 and 450 via the crossbar switches 432 and 434. Filter units 452 of the outlet data transfer processors 440 and 450 pass the user data input from the switch 432 in the active state. The user data passed through the filter units 452 are stored in buffer units 454. On the other hand, the user data input from the switch 434 in the standby state are blocked by the filter units 452 so that the user data from the switch 434 are not stored in the buffer units 454.

Path change units 456 of the outlet data transfer processors 440 and 450 change paths of the user data in order to output the user data from a buffer, which is assigned to the switch 432 in the active state, as the effective user data based on the state information on the switches 432 and 434. Here, the state information is input to path control units 458 while being included in the frame header information on the user data, or via separate signal paths between the complex interconnection switch 430 and the data transfer processors 440 and 450.

When the data transfer processors are normally connected to the switches 432 and 434 that are in the active state and the standby state, respectively, the operations for transferring the user data are performed as described above. However, when an error occurs in the connection of one of the data transfer processors and the switch 432 in the active state, the operations for transferring the user data are performed as follows.

It is assumed that the user data input to the first inlet data transfer processor 410 is transferred to the second outlet data transfer processor 450. In this case, if an error occurs in the connection between the first inlet data transfer processor 410 and the switch 432 in the active state, the first inlet data transfer processor 410 recognizes the switch 434 in the standby state as in the active state. Thus, the user data input from the first inlet data transfer processor 410 to the complex interconnection switch 430 is input to the second outlet data transfer processor 450 via the switch 434 in the standby state.

Here, the effective user data transferred from the second inlet data transfer processor 420 is input to the second outlet data transfer processor 450 via the switch 432 in the active state. Thus, the second outlet data transfer processor 450 receives different effective user data from the switches 432 and 434. In this case, the path control unit 458 in the second outlet data transfer processor 450 collects the state information, which is included in the frame header information on the user data. Thereafter, when it is determined that all of the data are effective, the path control unit 458 controls the path change unit 452 by performing the scheduling. Accordingly, the switch fabric apparatus 400 operates as a switch having a 1+1 redundancy function of link unit.

Figure 5:
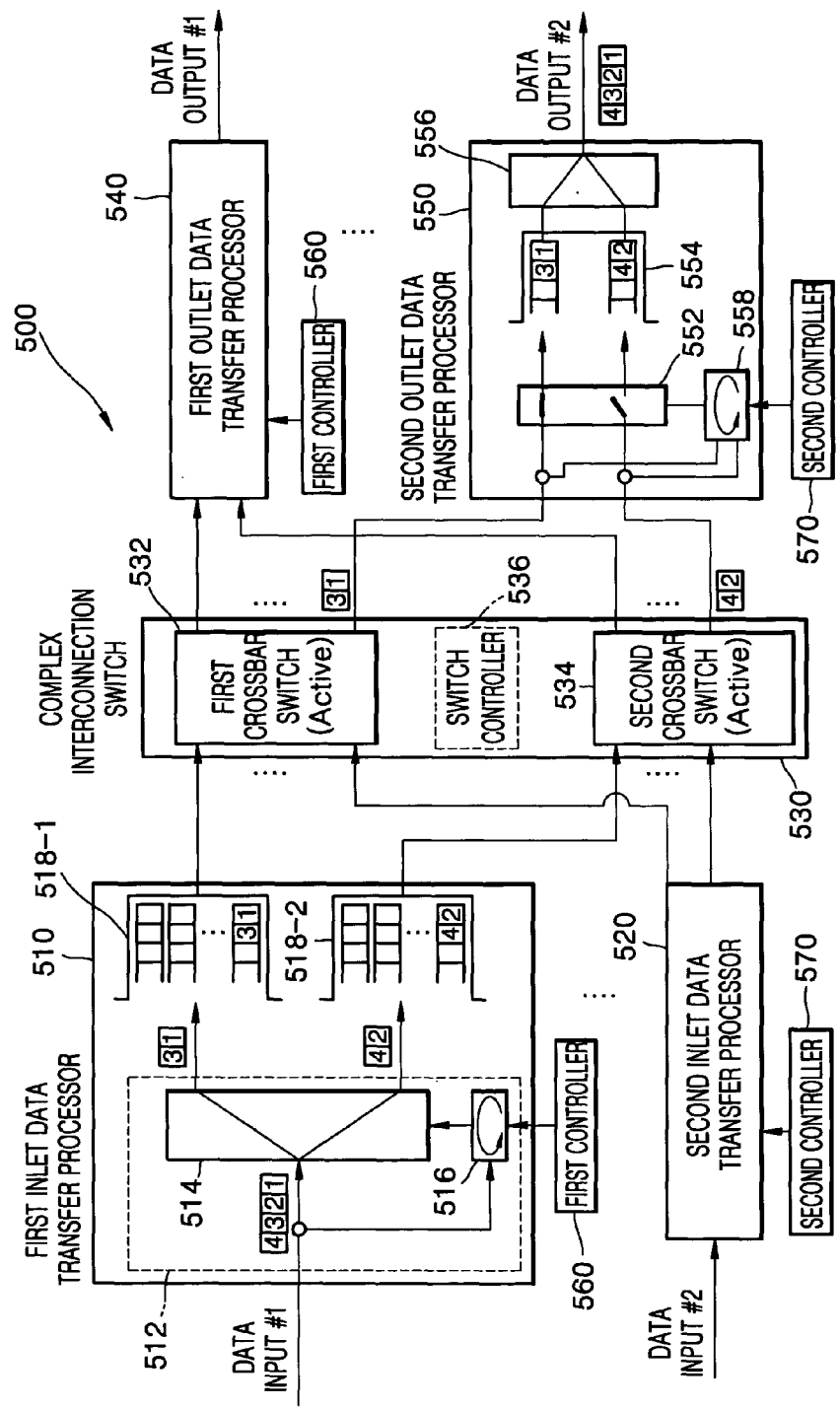
FIG. 5 is a block diagram illustrating a multi-functional switch fabric apparatus according to a second embodiment of the present invention to construct a switch fabric having a large capacity at a low cost.

FIG. 5 is a block diagram illustrating a multi-functional switch fabric apparatus according to a second embodiment of the present invention to construct a switch fabric having a large capacity at a low cost. The switch fabric apparatus of FIG. 5 is the same as that of FIG. 4, except for two interconnection switches that are in active states.

When a switch fabric apparatus 500 is set in a mode for operating at a large capacity, a transfer path and mode set unit 512 is set to perform a distribution function, such as load balancing. In addition, outlet data transfer processors 540 and 550 are set to select and output user data that are input from two interconnection switches 532 and 534 according to a proper scheduling method.

In other words, when the user data are input to a first inlet data transfer processor 510, the transfer path and mode set unit 512 performs a proper distribution function to store the user data in corresponding VOQs, which are included in unit inlet data transfer processors 518-1 and 518-2. The user data distributed to the VOQs of the unit inlet data transfer processors 518-1 and 518-2 are output to the second outlet data transfer processor 550 via the interconnection switches 532 and 534.

The user data input to the second output data transfer processor 550 are buffered in a buffer unit 554 via a filter unit 552. A path control unit 558 performs a proper scheduling function to output the user data from the buffer unit 554 via a path change unit 556. The operation of the switch fabric apparatus 500 is the same as that of the conventional switch fabric apparatus for improving capacity and speed that is formed of one unit inlet data transfer processor, a plurality of interconnection switches, and an outlet data transfer processor.

Figure 6:
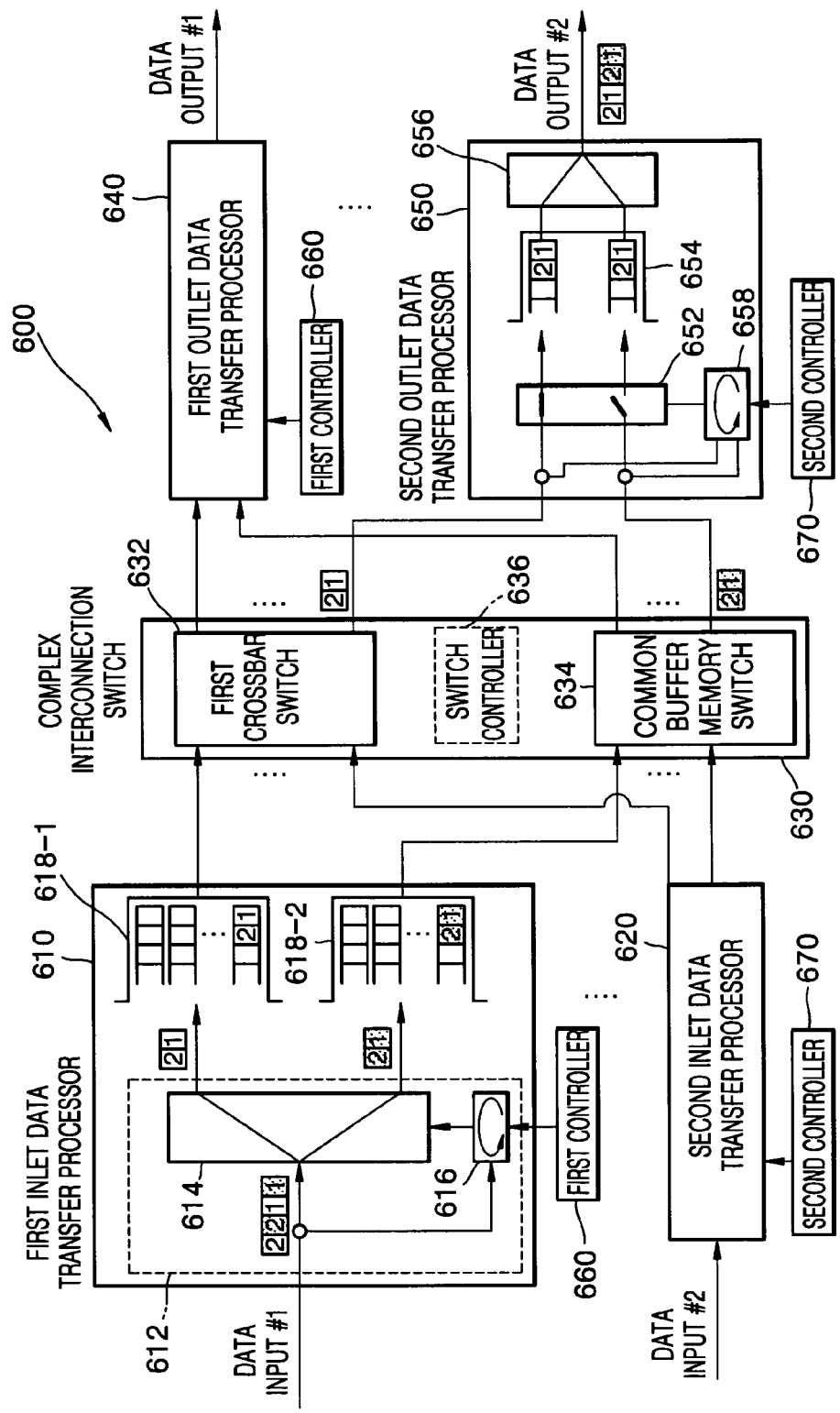
FIG. 6 is a block diagram illustrating a multi-functional switch fabric apparatus according to a third embodiment of the present invention to efficiently switch between various transfer methods.

FIG. 6 is a block diagram illustrating a multi-functional switch fabric apparatus according to a third embodiment of the present invention to efficiently switch various transfer methods. The structure of the switch fabric apparatus of FIG. 6 is the same as those of FIGS. 4 and 5, except for two interconnection switches having different functions.

Two interconnection switches 632 and 634 included in a switch fabric apparatus 600 of FIG. 6 use the same matching methods as data transfer processors, for example, physical signal level and frame size. Here, the switches 632 and 634 are different from each other. The IP based crossbar switch 632 is proper to transfer general information, and the common buffer memory switch 634 having excellent broadcasting performance efficiently processes streaming services, such as cable TV (CATV) or video on demand (VOD). In other words, different switches can be used in the complex interconnection switch 630 considering the performance and cost efficiency according to the characteristic of required services, for example, burst characteristic, packet size, and data broadcasting. Here, the scheduling function, the buffering function, a packet size setting function, and an information transferring/receiving function with the complex interconnection switch 630 that are implemented in the inlet data transfer processors 610 and 620 are performed depending on the switches 632 and 634 to which the inlet data transfer processors 610 and 620 are connected.

When the switch fabric apparatus 600 is set to operate according to the transfer method or service type, a transfer path and mode set unit 612 is set to perform the distribution function according to the service type of a user data frame. In addition, outlet data transfer processors 640 and 650 are set to perform a function of selecting and outputting the user data of different service type from the complex interconnection switch 630, by applying proper weights and using a scheduling method.

In other words, when the user data are input to the first inlet data transfer processor 610, the transfer path and mode set unit 612 distributes the user data to different paths according to the service type of the user data, based on a rule set by an operator. The distributed user data are stored in corresponding VOQs in unit inlet data transfer processors 618-1 and 618-2. Thereafter, the user data are input to the second outlet data transfer processor 650 via two different switches 632 and 634. The user data input to the second outlet data transfer processor 650 are buffered in a buffer unit 654 and output through a path change unit 656 based on the rule set by the operator and a scheduling function of a path control unit 658.

The present invention can be realized as a code on a recording medium which can be read out by a computer. Here, the recording medium includes any kind of recording devices in which data are recorded, such as ROM, RAM, CD-ROM, a magnetic tape, a floppy disk, and an optical data recording device. In addition, the recording media read out by a computer are distributed to computer systems, connected by a network, to record and execute codes, which can be read out by a computer, in a distribution manner.

As described above, the multi-functional switch fabric apparatus and a control method of the same according to the present invention have advantages as follows.

First, a plurality of identical switches are used in the switch fabric apparatus according to the present invention to select the performance and the function of the switch fabric apparatus according to the application field so that it is possible to realize systems efficient to various transfer methods, using the switch fabric having the same shape.

Second, the switch fabric apparatus is realized using the switch fabric hardware having the same shape so that the switch fabric apparatus may have the 1+1 redundancy function of link unit that guarantees high reliability, or the switch fabric can be realized at a low cost. In addition, the switch fabric apparatus can efficiently switch various transfer methods, or a discriminatory service can be provided.

Third, the user data of various transfer methods are efficiently transferred and switched so that the switch fabric apparatus can be applied to a multi-service switch system, a multi-functional switch system, and a complex switch system.

While this invention has been particularly shown and described with reference to preferred embodiments thereof, it will be understood by those skilled in the art that various changes in form and details may be made therein without departing from the spirit and scope of the invention as defined by the appended claims.

What is claimed is:

1. A multi-functional switch fabric apparatus comprising:
   a plurality of input data processors including a plurality of unit inlet data processors, which copy, distribute, switch, and output input user data according to a mode set signal from the outside;
   a switch fabric unit, which includes a plurality of switching units and selectively outputs the user data input from the plurality of input data processors according to the mode set signal;
   a plurality of output data processors, which buffer, schedule, multiplex, and output the user data input from the switch fabric unit; and
   a control unit, which outputs the mode set signal to control the plurality of input data processors, the switch fabric unit, and the plurality of output data processors, wherein each unit inlet data processor is coupled to a separate switching unit.

2. The multi-functional switch fabric apparatus of claim 1, wherein the input data processor comprises:
   a path and a mode set unit, which copies, switches, or distributes the user data to a path that is set based on the mode set signal;
   wherein the plurality of unit inlet data processors are connected to the path and mode set unit to buffer, virtual output buffer queue, schedule, switch, or demultiplex the user data.

3. The multi-functional switch fabric apparatus of claim 1, wherein the output data processor comprises:
   a filter unit, which selectively passes the user data input from the switch fabric unit according to the mode set signal;
   a plurality of buffer units, which buffer the user data passed through the filter unit;
   a path change unit, which selects and outputs the user data input from the plurality of buffer units according to a predetermined path change signal; and
   a path control unit, which outputs the path change signal according to the mode set signal.

4. The multi-functional switch fabric apparatus of claim 2, wherein each of the plurality of switching units included in the switch fabric unit are crossbar switches, and
   the control unit outputs a first mode set signal, which allows the path and the mode set unit to copy and supply the user data to the plurality of unit inlet data processors, at least one of the switching units to operate as an active switch, and the outlet data processor to select one of the user data input from the switch fabric unit as an effective data.

5. The multi-functional switch fabric apparatus of claim 4, wherein the outlet data processor selects the user data, which is provided from the switch in an active state, as the effective data.

6. The multi-functional switch fabric apparatus of claim 4, wherein when an error occurs in the connection to the switch operating in an active state, the output data processor selects the user data, which is provided from the switch in a standby state, as an effective state.

7. The multi-functional switch fabric apparatus of claim 2, wherein each of the plurality of switching units included in the switch fabric unit are crossbar switches, and
   the control unit outputs a second mode set signal, which allows the path and the mode set unit to distribute the user data to the plurality of unit inlet data processors, the switching units to operate as active switches, and the outlet data processor to schedule and output the plurality of user data input from the switch fabric unit.

8. The multi-functional switch fabric apparatus of claim 2, wherein the switch fabric unit includes a plurality of switches that transfer data by different methods, and the control unit outputs a third mode set signal, which allows the path and the mode set unit to distribute the user data to the plurality of unit inlet data processors according to the service type of the user data, and the outlet data processor to schedule and output the plurality of user data input from the switch fabric unit.

9. A control method for a multi-functional switch fabric apparatus, the control method comprising:

copying, switching, or distributing input user data to a predetermined path according to a predetermined mode set signal by a plurality of input data processors each including a plurality of unit inlet data processors;

buffering, virtual output buffer queuing, scheduling, switching, or de-multiplexing the user data according to the mode set signal by a switch fabric including a plurality of separate switching units;

selectively outputting the user data according to the mode set signal by using the plurality of switching units; and buffering, scheduling, or multiplexing and outputting the user data according to the mode set signal.

10. The control method of claim 9, wherein selectively outputting the user data comprises:

selectively passing the user data input from the switching units according to the mode set signal;

buffering the passed user data; and selectively outputting the buffered user data according to a predetermined path change signal.

11. The control method of claim 9, wherein each of the plurality of switching units are crossbar switches of which at least one operates as an active switch, the input user data are copied and supplied to each of the plurality of unit inlet data processors when copying, switching, or distributing input user data to the predetermined path according to the predetermined mode set signal, and one of the plurality of user data input from the switching units is selected and output as an effective data when selectively outputting the user data according to the mode set signal by using a plurality of switching units.

12. The control method of claim 11, wherein the user data output from the at least one switching unit operating as an active switch is selected and output as the effective data when selectively outputting the user data according to the mode set signal by using a plurality of switching units.

13. The control method of claim 11, wherein when an error occurs in the connection to the at least one switching unit operating as the active switch, the user data, which is provided from the switching unit operating as a standby switch, is selected and output as an effective data.

14. The control method of claim 9, wherein each of the plurality of switching units are crossbar switches in an active state, the user data are distributed to each of the plurality of unit inlet data processors when copying, switching, or distributing input user data to the predetermined path according to the predetermined mode set signal, and the plurality of user data input from the switching units are scheduled and output when selectively outputting the user data according to the mode set signal by using a plurality of switching units.

15. The control method of claim 9, wherein the plurality of switching units are each switches that transfer data by different methods, the user data are distributed to the plurality of unit inlet data processors according to the service type of the user data when copying, switching, or distributing input user data to the predetermined path according to the predetermined mode set signal, and the plurality of user data input from the plurality of switching units are scheduled and output when selectively outputting the user data according to the mode set signal by using a plurality of switching units.

16. A recording medium containing instructions, which, when read by a computer causes the computer to:

copy, switch, or distribute input user data into a predetermined path according to a predetermined mode set signal by a plurality of input data processors each including a plurality of unit inlet data processors;

buffer, virtual output buffer queue, schedule, switch, or de-multiplex the user data according to the mode set signal by a switch fabric including a plurality of separate switching units;

selectively output the user data according to the mode set signal by using a plurality of switching units; and buffer, schedule, or multiplex and output the user data according to the mode set signal, wherein the computer performs a control method of a multi-functional switch fabric apparatus.

* * * * *